US012005962B2

(12) United States Patent
Nakamura et al.

(10) Patent No.: US 12,005,962 B2
(45) Date of Patent: Jun. 11, 2024

(54) VEHICLE

(71) Applicants: TOYOTA JIDOSHA KABUSHIKI KAISHA, Toyota (JP); SUBARU CORPORATION, Tokyo (JP)

(72) Inventors: Kentaro Nakamura, Toyota (JP); Satoshi Ikeda, Tokyo (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 338 days.

(21) Appl. No.: 17/570,825

(22) Filed: Jan. 7, 2022

(65) Prior Publication Data

US 2022/0234655 A1 Jul. 28, 2022

(30) Foreign Application Priority Data

Jan. 26, 2021 (JP) ................. 2021-010497

(51) Int. Cl.
*B62D 25/14* (2006.01)
*B60K 1/04* (2019.01)
*B62D 25/20* (2006.01)

(52) U.S. Cl.
CPC ............. *B62D 25/145* (2013.01); *B60K 1/04* (2013.01); *B62D 25/2045* (2013.01); *B60K 2001/0438* (2013.01)

(58) Field of Classification Search
None
See application file for complete search history.

(56) References Cited

U.S. PATENT DOCUMENTS

| 7,798,562 | B2* | 9/2010 | Wrobel | B62D 21/157 |
| | | | | 296/203.01 |
| 9,266,568 | B2* | 2/2016 | Nishino | B62D 25/2045 |
| 10,118,647 | B2* | 11/2018 | Yoshida | B62D 21/155 |
| 10,160,493 | B2* | 12/2018 | Atsumi | B62D 25/2018 |
| 10,351,178 | B2* | 7/2019 | Han | B62D 25/2045 |
| 10,399,607 | B2* | 9/2019 | Sasakura | B62D 25/2018 |
| 10,486,516 | B2* | 11/2019 | Yamanaka | B60K 1/04 |
| 10,603,999 | B2* | 3/2020 | Fukui | B62D 25/20 |
| 10,633,035 | B2* | 4/2020 | Izutsu | B62D 25/2018 |
| 10,661,832 | B2* | 5/2020 | Maier | B62D 29/008 |

(Continued)

FOREIGN PATENT DOCUMENTS

| JP | 64-028379 U | 2/1989 |
| JP | 2015-101217 A | 6/2015 |

(Continued)

*Primary Examiner* — Gregory A Blankenship
(74) *Attorney, Agent, or Firm* — Dinsmore & Shohl LLP

(57) ABSTRACT

A vehicle including a vehicle body that includes: a floor panel; a dash panel; a first and a second dash cross members extending in a right-left direction of the vehicle along the dash panel; and a center tunnel extending from the dash panel rearward in the vehicle along the floor panel. The first dash cross member includes a right side portion extending from a right side face of the center tunnel to a right end of the dash panel and a left side portion extending from a left side face of the center tunnel to a left end of the dash panel. The second dash cross member is located above the first dash cross member and continues from the right end to the left end of the dash panel, and at least a part of the second dash cross member extends to curve along the center tunnel.

1 Claim, 2 Drawing Sheets

(56) References Cited

U.S. PATENT DOCUMENTS

| | | | |
|---|---|---|---|
| 10,988,178 B2 * | 4/2021 | Ohba | B62D 25/2045 |
| 11,370,287 B2 * | 6/2022 | Tsuyuzaki | B62D 21/157 |
| 11,472,487 B2 * | 10/2022 | Nakamura | B62D 25/145 |
| 2005/0140179 A1 | 6/2005 | Morsch et al. | |
| 2013/0088044 A1 | 4/2013 | Charbonneau et al. | |
| 2015/0145283 A1 * | 5/2015 | Nishino | B62D 25/145 |
| | | | 296/187.1 |
| 2015/0145284 A1 | 5/2015 | Nishida et al. | |
| 2015/0232127 A1 * | 8/2015 | Atsumi | B62D 25/2045 |
| | | | 296/187.08 |
| 2016/0052561 A1 * | 2/2016 | Atsumi | B62D 25/2018 |
| | | | 296/187.08 |
| 2019/0023321 A1 | 1/2019 | Ayukawa | |
| 2019/0232773 A1 * | 8/2019 | Kasai | B62D 21/157 |
| 2022/0315129 A1 * | 10/2022 | Inoue | B62D 25/20 |

FOREIGN PATENT DOCUMENTS

| | | |
|---|---|---|
| JP | 2015-101218 A | 6/2015 |
| JP | 2018-140711 A | 9/2018 |
| JP | 2019-018732 A | 2/2019 |
| JP | 2019-130978 A | 8/2019 |
| WO | 2014/162493 A1 | 10/2014 |

* cited by examiner

VEHICLE

CROSS-REFERENCE TO RELATED APPLICATION

This application claims priority to Japanese Patent Application No. 2021-010497 filed on Jan. 26, 2021, incorporated herein by reference in its entirety.

BACKGROUND

1. Technical Field

The technology disclosed in the present specification relates to a vehicle.

2. Description of Related Art

Japanese Unexamined Patent Application Publication No. 2015-101218 (JP 2015-101218 A) describes a base structure of a vehicle body. The vehicle body includes a floor panel, a dash panel located at a front end of the floor panel, a dash cross member extending in a right-left direction along the dash panel, and a center tunnel extending rearward from the dash panel along the floor panel. The dash cross member is divided into right and left portions by the center tunnel. On both sides of the center tunnel, a plurality of reinforcements extending rearward from the dash cross member is provided along the floor panel. According to such a configuration, a collision load due to a frontal collision, for example, is dispersed among the center tunnel and the reinforcements, so that unintended deformation of the vehicle body can be reduced.

SUMMARY

Vehicles with traction motors, which are so-called electric vehicles, are coming into widespread use. This type of vehicle requires a relatively large battery pack, which can, for example, occupy an extra space in a vehicle cabin. Accordingly, a layout in which such a large battery pack is disposed below a floor panel is effective. In some embodiments, when such a layout is employed, the floor panel is flat, for example, from the perspective of lowering the floor panel. Accordingly, providing the aforementioned reinforcements along the floor panel is difficult. However, when the reinforcements are not provided, a collision load due to a frontal collision or the like is primarily applied to a center tunnel. In such a case, a dash cross member and a center tunnel need to be strongly joined.

The present specification provides technology for strongly joining a dash cross member and a center tunnel in a vehicle in which a battery pack is disposed below a floor panel.

The technology disclosed in the present specification is used in a vehicle including a traction motor. A vehicle according to an aspect disclosed in the present specification includes a vehicle body and a battery pack. The vehicle body includes: a floor panel, a dash panel located at a front end of the floor panel, a first dash cross member and a second dash cross member extending in a right-left direction of the vehicle along the dash panel, a center tunnel extending from the dash panel rearward in the vehicle along the floor panel. The battery pack is disposed below the floor panel and is configured to supply electric power to the traction motor. The first dash cross member includes a right side portion extending from a right side face of the center tunnel to a right end of the dash panel and a left side portion extending from a left side face of the center tunnel to a left end of the dash panel. The second dash cross member is located above the first dash cross member and continues from the right end to the left end of the dash panel, and at least a part of the second dash cross member extends to curve along the right side face, an upper face, and the left side face of the center tunnel.

In the above structure, two dash cross members are provided along the dash panel. The first dash cross member located below the second dash cross member is divided into right and left portions by the center tunnel, with the right side portion and the left side portion being connected to the respective side faces of the center tunnel. On the other hand, the second dash cross member located above the first dash cross member continues to extend along the outline of the center tunnel. At least the part of the second dash cross member adjacent to the center tunnel extends to curve along a shape of the center tunnel. According to such a configuration, the two dash cross members are connected to the center tunnel over a long distance, so that the dash cross members and the center tunnel are strongly joined.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
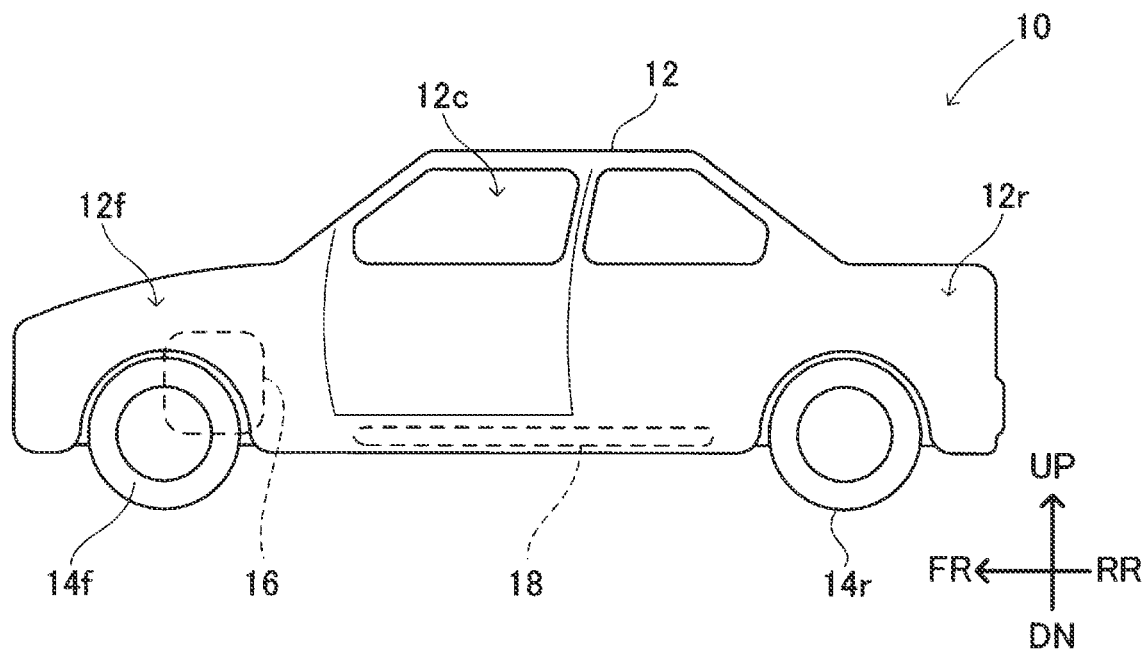
FIG. 1 is a left side view of a vehicle.

In an embodiment of the present technology, a width dimension of each of a right side portion and a left side portion of a first dash cross member in a front-rear direction of a vehicle may increase toward a center tunnel. According to such a configuration, the right side portion and the left side portion of the first dash cross member each include a large cross-section at a position where each of the right side portion and the left side portion is connected to the center tunnel, so that each of the right side portion and the left side portion is joined more strongly to the center tunnel.

In the above embodiment, a second dash cross member extends to curve from a right end to a left end of a dash panel, with at least a part of the second dash cross member coming into contact with the first dash cross member. For example, the second dash cross member may extend to curve along an upper edge of the first dash cross member of which the width dimension changes. According to such a configuration, the unity of the first dash cross member and the second dash cross member can be improved.

A vehicle 10 according to the embodiment will be described with reference to the drawings. The vehicle 10 according to the embodiment is a so-called automobile, and is a vehicle that travels on a road surface. Note that the direction FR in the drawings indicates forward in a front-rear direction (vehicle-length direction) of the vehicle 10, and the direction RR indicates rearward in the front-rear direction of the vehicle 10. Also, the direction LH indicates leftward in a right-left direction (vehicle-width direction) of the vehicle 10, and the direction RH indicates rightward in the right-left direction of the vehicle 10. The direction UP indicates upward in an up-down direction (vehicle-height direction) of the vehicle 10, and the direction DN indicates downward in the up-down direction of the vehicle 10. Note that in the present specification, the front-rear direction, the right-left direction, and the up-down direction, of the vehicle 10 may be simply referred to as the front-rear direction, the right-left direction, and the up-down direction, respectively.

Figure 2:
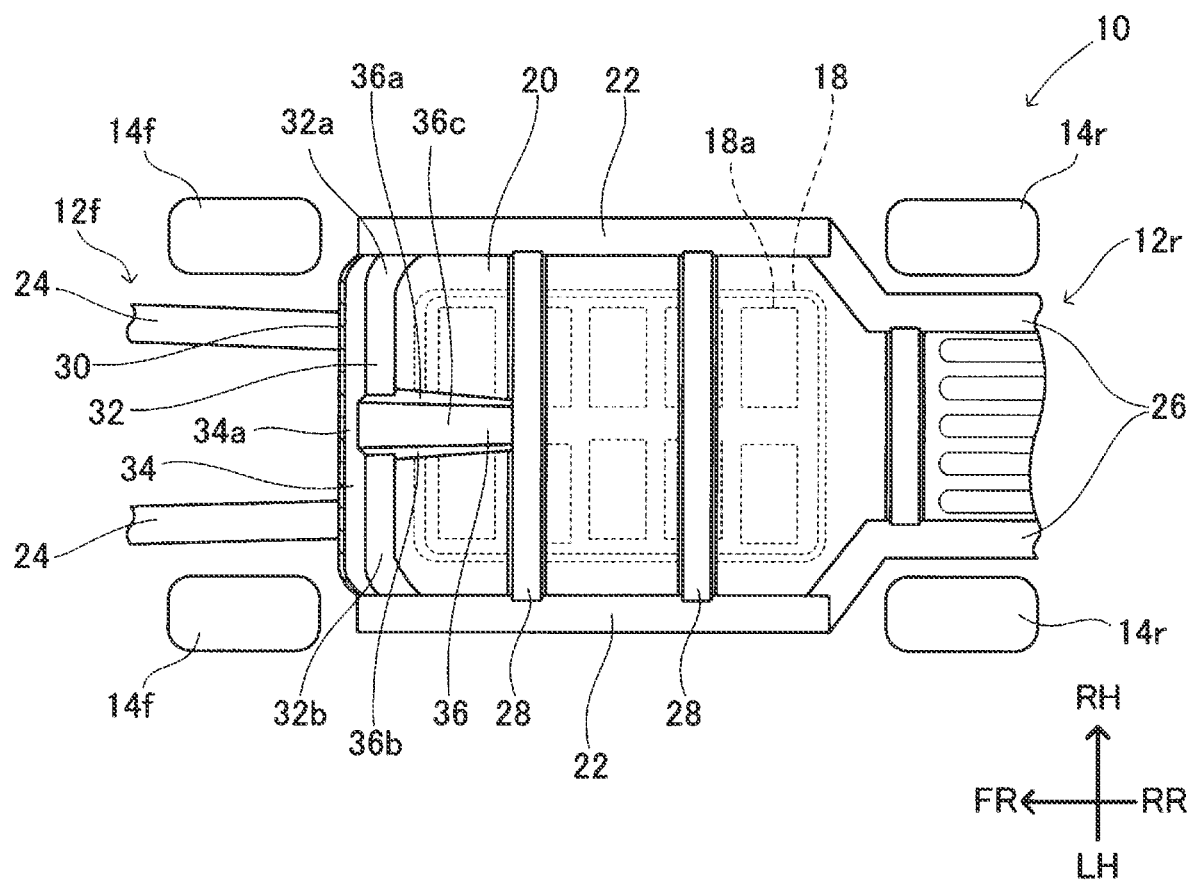
FIG. 2 is a planar view schematically illustrating a structure of a vehicle body.

As illustrated in FIGS. 1 and 2, the vehicle 10 is provided with a vehicle body 12 and a plurality of wheels 14f and 14r. The vehicle body 12 is primarily configured using a metal material, although this is not particularly limited. The wheels 14f and 14r are rotatably attached to the vehicle body 12. The wheels 14f and 14r include a pair of front wheels 14f and a pair of rear wheels 14r. Note that the number of wheels 14f and 14r is not limited to four. The vehicle body 12 can be generally sectioned into a cabin 12c in which a user rides, a front portion 12f located forward of the cabin 12c, and a rear portion 12r located rearward of the cabin 12c.

The vehicle body 12 is provided with a floor panel 20, a pair of rockers 22, a pair of front side members 24, and a pair of rear side members 26. The floor panel 20 is a plate-like member that extends in the front-rear direction and the right-left direction, and constitutes a floor of the cabin 12c. A plurality of floor cross members 28 is provided on an upper face of the floor panel 20. Each floor cross member 28 has a generally tubular structure, and constitutes a part of a framework of the vehicle body 12.

The rockers 22 (also referred to as side sills) each extend in the front-rear direction along right and left side edges of the floor panel 20. Each rocker 22 has a generally tubular structure, and constitutes a part of the framework of the vehicle body 12. Front ends of the rockers 22 are connected to the front side members 24 via dash cross members 32 and 34 described below. Rear ends of the rockers 22 are connected to the rear side members 26. Inside each rocker 22, one or a plurality of bulkheads (partitions) may be provided to increase the strength and rigidity of the rocker 22.

The front side members 24 are located at a front portion 12f and each extend forward. The front side members 24 have a generally tubular structure extending in the front-rear direction, and constitutes a part of the framework of the vehicle body 12. A front bumper reinforcement is attached to a front end of each of the front side members 24, although it is not shown. The rear side members 26 are located at a rear portion 12r and extend rearward continuing from the rockers 22. The rear side members 26 have a generally tubular structure extending in the front-rear direction, and constitutes a part of the framework of the vehicle body 12. A rear bumper reinforcement is attached to a rear end of each of the rear side members 26, although it is not shown.

The vehicle body 12 is further provided with a dash panel 30, two dash cross members 32 and 34, and a center tunnel 36. The dash panel 30 is located at a front end of the floor panel 20 and constitutes a partition wall that separates the front portion 12f and the cabin 12c. The two dash cross members 32 and 34 extend in the right-left direction along the dash panel 30. The two dash cross members 32 and 34 include a first dash cross member 32 and a second dash cross member 34. Each dash cross member 32 and 34 has a generally tubular structure, and constitutes a part of the framework of the vehicle body 12. Specific configurations of the first dash cross member 32 and the second dash cross member 34 will be described in detail below. The center tunnel 36 extends rearward from the dash panel 30 along the floor panel 20. The center tunnel 36 is located at the middle of the floor panel 20 in the right-left direction, and protrudes upward with respect to the floor panel 20.

The vehicle 10 is further provided with a traction motor 16 and a battery pack 18. The traction motor 16 is disposed in the front portion 12f, although this is not particularly limited. The traction motor 16 is connected to the front wheels 14f and drives the front wheels 14f. Note that the vehicle 10 may be provided with a second traction motor that drives the rear wheels 14r, in addition to, or instead of, the traction motor 16 that drives the front wheels 14f. Further, the vehicle 10 may be provided with another prime mover such as an engine, in addition to the traction motor 16.

The battery pack 18 is disposed below the floor panel 20 and is located between the rockers 22. The battery pack 18 is a power source for the traction motor 16, and stores electric power to be supplied to the traction motor 16. The battery pack 18 is electrically connected to the traction motor 16 via a power supply circuit (not shown) such as a direct current-direct current (DC-DC) converter or an inverter. The battery pack 18 in the present embodiment includes a plurality of cell stacks 18a, although this is not particularly limited. Each cell stack 18a includes a plurality of lithium-ion battery cells (or other secondary battery cells), and is configured to be rechargeable. Note that the vehicle 10 may be provided with other power sources, such as a fuel cell unit, a solar cell panel, or the like, in addition to the battery pack 18.

Figure 3:
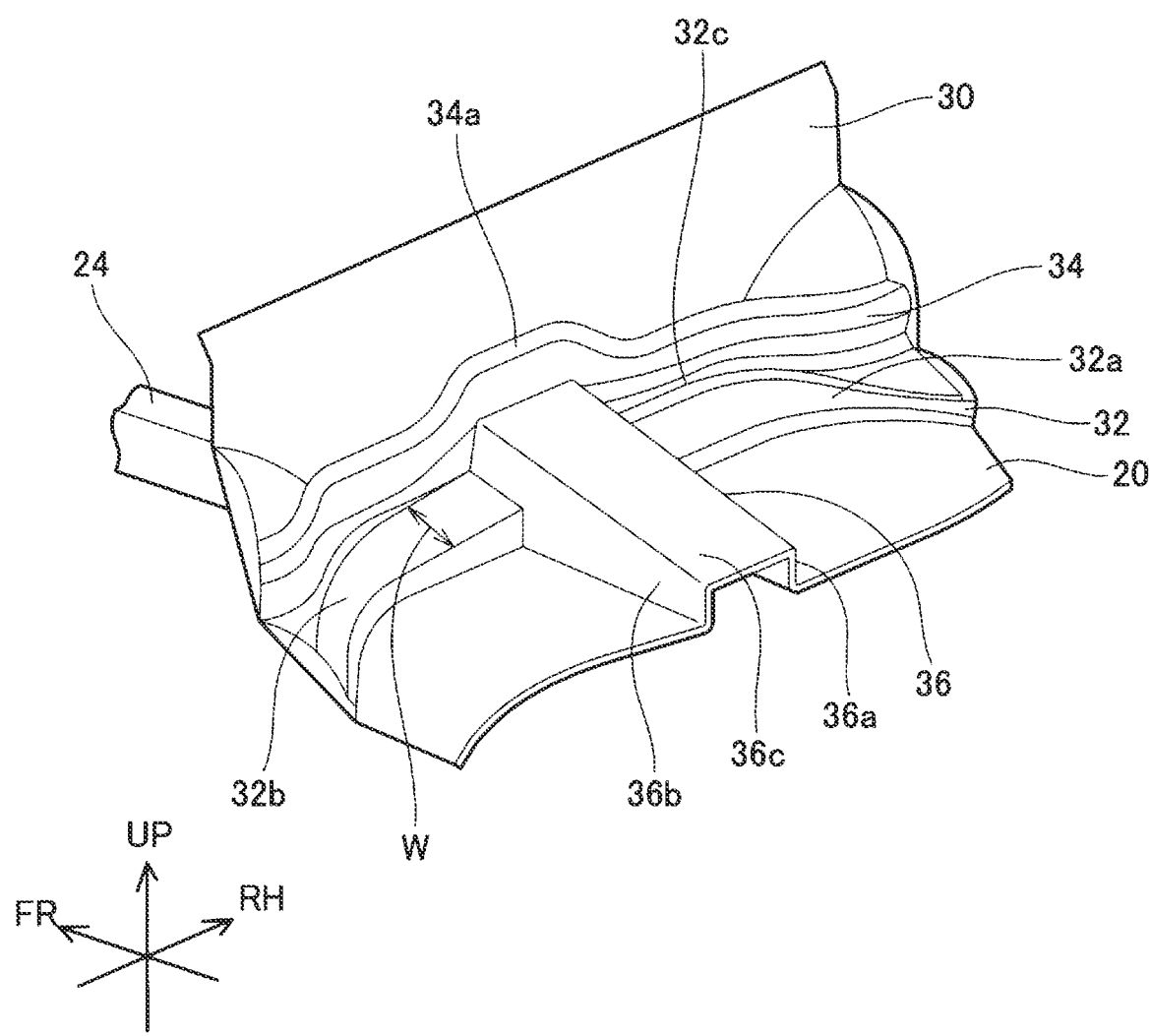
FIG. 3 is a perspective view illustrating a joining portion of dash cross members and a center tunnel.

Next, the configurations of the two dash cross members 32 and 34 will be described. As illustrated in FIGS. 2 and 3, the first dash cross member 32 is located below the second dash cross member 34, and is divided into right and left portions by the center tunnel 36. That is to say, the first dash cross member 32 includes a right side portion 32a extending from a right side face 36a of the center tunnel 36 to the right end of the dash panel 30, and a left side portion 32b extending from a left side face 36b of the center tunnel 36 to the left end of the dash panel 30.

The second dash cross member 34 is located above the first dash cross member 32, and extends to continue from the right end to the left end of the dash panel 30. An intermediate portion 34a of the second dash cross member 34 extends to curve along the right side face 36a, an upper face 36c, and the left side face 36b of the center tunnel 36. That is to say, the second dash cross member 34 is not divided by the center tunnel 36, and extends above the center tunnel 36 to circumvent the center tunnel 36.

As described above, in the vehicle 10 according to the present embodiment, the two dash cross members 32 and 34 are provided along the dash panel 30. The first dash cross member 32 located below the second dash cross member 34 is divided into the right and left portions by the center tunnel 36, with the right side portion 32a and the left side portion 32b being connected to the side faces 36a and 36b of the center tunnel 36, respectively. On the other hand, the second dash cross member 34 located above the first dash cross member 32 continues to extend along the outline of the center tunnel 36. The intermediate portion 34a of the second dash cross member 34 adjacent to the center tunnel 36 extends to curve along the shape of the center tunnel 36. According to such a configuration, the two dash cross members 32 and 34 are connected to the center tunnel 36 over a long distance, so that the dash cross members 32 and 34 and the center tunnel 36 are strongly joined.

When the dash cross members 32 and 34 and the center tunnel 36 are strongly joined, a collision load due to a frontal collision or the like, for example, can be primarily applied to the center tunnel 36. Accordingly, providing a great number of reinforcements on the floor panel 20 is unnecessary, and the shape of the floor panel 20 can be made to be relatively flat. Thus, it is possible to reduce a possibility that the position of the floor panel 20 is high even in a layout in which the battery pack 18 is disposed below the floor panel 20, and the floor of the vehicle 10 can be lowered.

In the vehicle 10 according to the present embodiment, the right side portion 32a and the left side portion 32b of the first dash cross member 32 each have a shape in which the width dimension W of each of the right side portion 32a and the left side portion 32b in the front-rear direction of the vehicle increases toward the center tunnel 36 (See FIG. 3), although this is not particularly limited. According to such a configuration, the right side portion 32a and the left side portion 32b of the first dash cross member 32 each include a large cross-section at a position where each of the right side portion 32a and the left side portion 32b is connected to the center tunnel 36, so that the first dash cross member 32 and the center tunnel 36 are joined more strongly. Additionally, the second dash cross member 34 extends to curve from the right end to the left end of the dash panel 30, with at least a part of the second dash cross member 34 coming into contact with the first dash cross member 32. For example, the second dash cross member 34 extends to curve along an upper edge 32c of the first dash cross member 32 of which the width dimension W changes. According to such a configuration, the unity of the first dash cross member 32 and the second dash cross member 34 can be improved, and the strength and rigidity required of the vehicle body 12 can be realized more readily.

In the vehicle 10 according to the present embodiment, specific configurations of the two dash cross members 32 and 34 can be changed as appropriate. As described above, each of the dash cross members 32 and 34 is a structural member having a tubular structure that forms a closed space extending in the right-left direction. With regard to this point, the shapes of the closed spaces formed by the dash cross members 32 and 34 (that is to say, the cross-sectional shapes of the dash cross members 32 and 34) are not particularly limited. Also, one or both of the two dash cross members 32 and 34 may have a shape in which two or more closed spaces extending in the right-left direction are formed. Further, the closed spaces formed by the dash cross members 32 and 34 may be formed by the dash cross members 32 and 34 alone, or may be formed in conjunction with the dash panel and other members.

What is claimed is:

1. A vehicle including a traction motor, the vehicle comprising:
    a vehicle body including
        a floor panel,
        a dash panel located at a front end of the floor panel,
        a first dash cross member and a second dash cross member extending in a right-left direction of the vehicle along the dash panel,
        a center tunnel extending from the dash panel rearward in the vehicle along the floor panel; and
    a battery pack disposed below the floor panel, and configured to supply electric power to the traction motor, wherein
    the first dash cross member includes a right side portion extending from a right side face of the center tunnel to a right end of the dash panel and a left side portion extending from a left side face of the center tunnel to a left end of the dash panel,
    the second dash cross member is located above the first dash cross member and continues from the right end to the left end of the dash panel, and at least a part of the second dash cross member extends to curve along the right side face, an upper face, and the left side face of the center tunnel,
    a width dimension of each of the right side portion and the left side portion of the first dash cross member in a front-rear direction of the vehicle increases toward the center tunnel, and
    the second dash cross member extends to curve from the right end to the left end of the dash panel, with at least the part of the second dash cross member coming into contact with the first dash cross member.

* * * * *